Patented July 3, 1951

2,559,398

UNITED STATES PATENT OFFICE 2,559,398

WAX COMPOSITIONS AND METHOD FOR MAKING SAME

Robert G. Capell, Pittsburgh, Pa., assignor to Gulf Research & Development Company, Pittsburgh, Pa., a corporation of Delaware No Drawing. Application December 16, 1948, Serial No. 65,740

13 Claims. (Cl. 106—272)

This invention relates to wax compositions, and in particular to wax compositions having increased tensile strength. The invention pertains further to a method for increasing the tensile strength of a wax.

High tensile strength is desirable in waxes because of the correlation between tensile strength and the functional qualities of the wax in such applications as wrapping papers, fluid food containers, waterproof coatings, preservative covers for food products, electrical insulation, protective coatings for rubber products, floor coverings, and coatings of interiors of barrels and other containers. Waxes of increased tensile strength offer greater resistance to strains resulting from rough handling, scuffing, impact and bending.

I have discovered that compositions comprising compounds of bentonite with organic bases dispersed in waxes are useful for many purposes. Thus, I have found that the dispersion of a small amount of a bentonite-organic base compound in a wax results in a composition of greatly increased tensile strength over that of the solid wax and, therefore, of also greatly increased service qualities for many applications of the type recited above. I have also found that by intimately dispersing compounds of bentonite with organic bases in waxes while in the liquid form and then cooling, compounded waxes of increased tensile strength are obtained. A compound of this class, in accordance with a preferred embodiment of the invention, is intimately dispersed in a wax by introducing the wax and the compound in the desired proportions into a mixing device such as a steam-heated paint mill or a heated colloid mill, and repeatedly passing the mixture in plastic or fluid form through the mixing device to subject the mixture to a mechanical shearing action until the desired degree of dispersion of the compound in the wax is obtained.

The compositions of the invention comprise a dispersion of a bentonite-organic base compound in any of the solid or semi-solid waxes, including the animal, vegetable, mineral and synthetic waxes, examples of which are: spermaceti, beeswax, insect waxes, Chinese insect wax, fossil waxes, carnauba, Japan, bayberry, candelilla, ozokerite, montan, lignite waxes, crude scale waxes from petroleum, paraffin wax, petrolatum wax, micro-crystalline petroleum waxes, ceresin, wax esters, and Fischer-Tropsch or Synthine waxes. I have found that especially valuable results are obtained when a bentonite-organic base compound is dispersed in a petroleum wax, as the resulting product has increased tensile strength, lower penetration, and higher melting point than the original wax. The petroleum waxes include paraffin wax and the micro-crystalline waxes. These waxes when refined generally have melting points in the range of about 110° to 150° F., E. M. P., and the especially preferred waxes for use in preparing the compositions of the invention are paraffin waxes that have melting points within the range of about 122° to 132° F.

The bentonite compounds employed in accordance with the invention are compounds composed of a montmorillonite mineral in which at least a part of the cation content of the mineral has been replaced by an organic base. Clays that contain as a primary constituent a mineral of the group known as montmorillonites are generally referred to as bentonites. Such clays constitute the raw materials employed in making the bentonite-organic base compounds used in the improved wax compositions. So far as known all naturally occurring montmorillonites contain some magnesium and certain of them, as exemplified by Hector clay, contain such a high percentage of magnesium that they largely have magnesium in place of the aluminum content characteristic of the more typical montmorillonites. The bentonite-organic base compounds are preferably prepared as described in U. S. Patent No. 2,033,856, issued March 10, 1936; by bringing together the bentonite and the organic base in the presence of aqueous mineral acid to effect base exchange. The organic bases should preferably be titratable with mineral acids. Among these reactive bases are many alkaloids, and cyclic, aliphatic, and heterocyclic amines. With the mineral and synthetic waxes described above I prefer to use additive compounds prepared by bringing together a bentonite clay and such organic bases as aliphatic amines, their salts, and quaternary ammonium salts. Examples of such amines and salts are: decylamine, dodecylamine, tetradecylamine, hexadecylamine, octadecylamine, hexadecylammonium acetate, octadecylammonium acetate, dimethyldidodecylammonium acetate, dimethyldodecylhexadecyl ammonium acetate, dimethyldicetyl ammonium acetate, dimethyldioctyl ammonium acetate, dimethylhexadecyloctadecyl ammonium acetate, dimethyldioctadecyl ammonium acetate and the corresponding chlorides, and quaternary ammonium chlorides. The organic bases employed should be such as to impart substantial organophilic properties to the resulting compounds.

The preferred bentonite compounds are prepared from quaternary ammonium compounds in which the N-substituents are aliphatic groups containing a total of at least 12 carbon atoms. When aliphatic amines are used they preferably contain at least 10 carbon atoms.

The amount of bentonite compound used in the wax may vary over wide limits, depending upon the properties desired in the final composition, and may be as high as 40 per cent by weight, or more; but I prefer to use smaller amounts below about 10 per cent by weight to obtain products which retain the characteristic properties of the original wax. With the mineral and the synthetic waxes, especially the paraffin and the micro-crystalline waxes, I prefer to use from about 0.01 to about 10.0 per cent by weight of the additive compound, with the range of about 0.1 to 5.0 per cent being especially preferred; because the tensile strength improvement with less than 0.1 per cent of additive is only moderate in many cases, and with more than 5 per cent additive the final compositions are often relatively stiff and more difficult to handle in ordinary wax applications, such as coatings for paper and other materials.

In some instances, as in the case of short or single chain aliphatic amine bentonite compounds, for example, additional solvating action is desirable to aid in the dispersion of the compound in the wax and to obtain the maximum increase in tensile strength of the wax for a given amount of the additive compound. This solvating action can be supplied to the composition by the addition of small amounts of solvating agents. Preferred solvating agents are polar organic compounds which are substantially insoluble in the wax employed and are easily absorbed on bentonite clays. Examples of such compounds are: ethyl acetate, acetic acid, acetone, benzoyl chloride, butyl stearate, cocoanut oil, cyclohexanone, ethylene dichloride, ethyl ether, furfural, isoamyl acetate, methyl ethyl ketone, nitrobenzene, and toluene. The particular agent chosen will depend upon the subsequent application to be made of the wax compound and whether it is desired to remove the solvating agent from the mixture before preparing the finished composition, as well as upon the wax and the additive compound employed. The amount of solvating agent employed will also depend upon these same factors, but in general, the preferred concentrations of solvating agent to use will be in the range from about 1 to 30 per cent by weight based on the amount of bentonite compound employed.

The advantages of the invention will be still better understood from the following examples:

Example I 2.5 parts by weight of dimethyldicetylammonium bentonite were added to 97.5 parts by weight of 122° F. E. M. P. refined paraffin wax. The bentonite used to prepare the bentonite product was a California clay high in magnesium content known as Hector clay. The resulting mixture was passed through a heated colloid mill and cast into molds. It had a tensile strength of 110.4±1.7 pounds per quarter square inch at 70° F. as compared to 65.8±0.8 for the refined paraffin wax.

Example II 5 parts by weight of dimethyldicetylammonium bentonite were added to 95 parts by weight of the 122° F. E. M. P. refined paraffin wax used in Example I. The resulting mixture was passed through steam-heated paint rolls and then stirred with a mechanical stirrer. It had a fluid consistency such that it could be poured and cast in molds and could be used for coating purposes. It had a tensile strength of 123.2±1.1 pounds per quarter square inch at 70° F.

Example III 7.5 parts by weight of dimethyldicetylammonium bentonite were added to 92.5 parts by weight of 122° F. E. M. P. refined paraffin wax and the mixture was passed through steam-heated paint rolls until a fairly uniform mixture was obtained. This mixture was stirred with the aid of a motor-driven stirrer to insure complete uniformity. The final product was of a grease-like consistency which could be molded or pressed.

Other compositions were prepared from paraffin wax and dimethyldicetylammonium bentonite in the manner described in Example I using respectively 10 per cent, 20 per cent and about 40 per cent by weight of the bentonite compound. The 10 per cent material was a stiff and doughy product which is adapted to be used as a component of various polishing pastes such as those for polishing floors, automobiles, and leather. The 20 per cent material was obtained from the rolls as firm, fibrous solid strips useful as a major component of various types of wax crayons, leather and belt dressings, and impregnating materials for fabrics, paper and wood. The 40 per cent material was a crumbly and granular product having value in wax floor powders and various types of anti-friction powders. These compositions, containing more than about 10 per cent of the organic base-bentonite compound, are also valuable as molding compounds in cold or hot molding by compression or injection methods to produce a variety of industrial shapes. They are also useful as softeners, lubricants and hardness modifiers in such applications as the mixing and processing of rubber and plastic compounds, for example.

Example IV

A blend of 15 parts by weight of octadecylamine bentonite prepared from Hector clay, 285 parts by weight of refined paraffin wax of 122° F. E. M. P., and 5 parts by weight of ethyl acetate solvating agent, was prepared. The blend was passed through a paint mill and subsequently stirred in a motor-driven stirrer. The resulting product was cast and tested for tensile strength at 70° F. It was found to have a tensile strength of 119.9±3.7 pounds per quarter square inch at 70° F. as compared to 65.8±0.8 for the original wax.

The following table shows the effect of varying amounts of a dimethyldicetylammonium bentonite on the tensile strength of a refined paraffin wax:

| Per cent by weight of dimethyldicetyl-ammonium bentonite in the blend based on the wax | Tensile strength of the blend in pounds per quarter square inch at 70° F. |
|---|---|
| None | 65.8±0.8 |
| 0.10 | 70.7±0.9 |
| 0.25 | 75.8±1.5 |
| 0.50 | 82.1±1.8 |
| 1.00 | 83.1±1.9 |
| 2.50 | 115.5±0.8 |
| 5.00 | 123.2±1.1 |

By using in place of the paraffin wax employed in the above examples, other solid waxes such as those previously mentioned, other valuable compositions are obtained. The micro-crystalline or petrolatum waxes are especially effective when substituted for the paraffin wax.

Obviously many modifications and variations of the invention as hereinbefore set forth, may be made without departing from the spirit and scope thereof, and therefore only such limitations should be imposed as are indicated in the appended claims.

I claim:

1. A composition of matter consisting essentially of a dispersion of about 0.01 to about 40 per cent by weight of the composition of a compound of a bentonite and an organic base in a wax.

2. A composition of matter consisting essentially of a dispersion of a compound of a bentonite and an organic base in a wax, the amount of said compound being sufficient to increase the tensile strength of the wax.

3. A wax composition consisting essentially of a dispersion of about 0.01 to about 40 per cent by weight of the composition of a compound of a bentonite and an organic base in a petroleum wax.

4. A composition as defined in claim 3, wherein the petroleum wax is a paraffin wax.

5. A wax composition of increased tensile strength consisting essentially of a dispersion of about 0.01 to about 40 per cent by weight of the composition of a compound of a bentonite and an aliphatic organic base containing at least 10 carbon atoms in a petroleum wax, the amount of said compound being sufficient to increase the tensile strength of the wax.

6. A wax composition as defined in claim 5, wherein the petroleum wax is a paraffin wax.

7. A wax composition as defined in claim 5, wherein the compound of a bentonite and an aliphatic organic base is present in an amount equal to between 0.01 and 10.0 per cent by weight of the mixture of the wax and the compound.

8. A wax composition of increased tensile strength consisting essentially of a dispersion of a compound of a bentonite and an aliphatic amine containing at least 10 carbon atoms in a petroleum wax, the amount of said compound being present in an amount equal to between 0.1 and 5.0 per cent by weight of the mixture of the wax and the compound.

9. A method of producing a wax composition which comprises intimately dispersing a compound of a bentonite and an organic base in the wax while in liquid form, the amount of said compound being sufficient to increase the tensile strength of the wax, subjecting the suspension to a mechanical shearing action to intimately disperse the bentonite compound in the wax, and then cooling the mixture to solidifying temperature.

10. A method of producing a wax composition which comprises forming a suspension of a compound of a bentonite and about 0.01 to about 40 per cent by weight of the composition of an aliphatic organic base containing at least 10 carbon atoms in the wax while in liquid form, subjecting the suspension to a mechanical shearing action to intimately disperse the bentonite compound in the wax, and cooling the suspension to solidifying temperature.

11. A wax composition consisting essentially of a dispersion of dimethyldicetylammonium bentonite in a wax the amount of said compound being sufficient to increase the tensile strength of the wax.

12. A wax composition consisting essentially of a dispersion of dimethyldicetylammonium bentonite in a wax in which said composition contains about 0.01 to about 40 per cent by weight of the composition of dimethyldicetylammonium bentonite.

13. A wax composition of increased tensile strength consisting essentially of a dispersion of about 0.1 to about 5 per cent by weight of the composition of dimethyldicetylammonium bentonite in a petroleum wax.

ROBERT G. CAPELL.

REFERENCES CITED

The following references are of record in the file of this patent:

UNITED STATES PATENTS

| Number | Name | Date |
| --- | --- | --- |
| 2,033,856 | Smith | May 10, 1936 |
| 2,214,263 | Weihe | Sept. 10, 1940 |

OTHER REFERENCES

Color Reactions between Clays and Amines, Journal Amer. Chem. Soc., vol. 62, pp. 1811–1814, July 1940.